United States Patent
Maheswaranathan

(10) Patent No.: US 10,064,005 B2
(45) Date of Patent: Aug. 28, 2018

(54) MOBILE DEVICE WITH CONFIGURABLE COMMUNICATION TECHNOLOGY MODES AND GEOFENCES

(71) Applicant: Hand Held Products, Inc., Fort Mill, SC (US)

(72) Inventor: Gaithri Maheswaranathan, London (GB)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/963,335

(22) Filed: Dec. 9, 2015

(65) Prior Publication Data

US 2017/0171703 A1    Jun. 15, 2017

(51) Int. Cl.
*H04W 4/00*    (2018.01)
*H04W 4/02*    (2018.01)
(Continued)

(52) U.S. Cl.
CPC ....... *H04W 4/021* (2013.01); *H04M 1/72572* (2013.01); *H04M 1/72583* (2013.01);
(Continued)

(58) Field of Classification Search
CPC ......... H04M 1/72519; H04M 1/72572; H04M 1/72522; H04M 1/7253; H04M 2250/02;
(Continued)

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Marlton et al. | |

(Continued)

FOREIGN PATENT DOCUMENTS

| | | |
|---|---|---|
| EP | 1492364 A1 | 12/2004 |
| WO | 2013163789 A1 | 11/2013 |

(Continued)

OTHER PUBLICATIONS

Transient definition, p. 830 merriam-webster dictionary of synonyms, merriam-webster inc. 1984.*

(Continued)

*Primary Examiner* — George Eng
*Assistant Examiner* — Umair Ahsan
(74) *Attorney, Agent, or Firm* — Additon, Higgins & Pendleton, P.A.

(57) ABSTRACT

Many machine-to-machine (M2M) devices and portable user devices have the ability to switch between cellular technology and satellite technology to ensure network connectivity. While the automatic handover is useful, there are situations where it is desirable to have greater control over the configuration of the communication modes of these devices. Accordingly, embodiments of the present invention describe the ability to designate a prioritized list of communication modes, the ability to manually configure communication modes directly on the device, the ability to configure communication modes remotely over the air, and the ability to configure communication modes according to a geofence.

25 Claims, 10 Drawing Sheets

| GEOFENCE | COMMUNICATION GROUP | COMMUNICATION INTERFACE | AREA NAME | AREA COORDINATES | NOTES |
|---|---|---|---|---|---|
| 1 | 1 | 1 | ZONE A | BOX[(33.0,-84.3),(36.4,-75.9)] | APPROX. NORTH CAROLINA, USA |
| 1 | 1 | 2 | ZONE A | BOX[(33.0,-84.3),(36.4,-75.9)] | APPROX. NORTH CAROLINA, USA |
| 1 | 3 | 6 | ZONE A | BOX[(33.0,-84.3),(36.4,-75.9)] | APPROX. NORTH CAROLINA, USA |
| 1 | 3 | 9 | ZONE A | BOX[(33.0,-84.3),(36.4,-75.9)] | APPROX. NORTH CAROLINA, USA |
| 2 | 2 | 5 | ZONE A | BOX[(33.0,-84.3),(36.4,-75.9)] | APPROX. NORTH CAROLINA, USA |
| 2 | 2 | 7 | ZONE A | BOX[(33.0,-84.3),(36.4,-75.9)] | APPROX. NORTH CAROLINA, USA |
| 3 | N/A | 8 | ZONE B | BOX[(30.2,-88.0),(34.9,-84.9)] | APPROX. ALABAMA, USA |
| N/A | 4 | 11 | N/A | N/A | UNUSED |
| N/A | N/A | 12 | N/A | N/A | UNUSED |
| N/A | N/A | 10 | N/A | N/A | UNUSED |
| N/A | N/A | 3 | N/A | N/A | MFR DEFAULT |
| N/A | N/A | 4 | N/A | N/A | MFR DEFAULT |

(51) Int. Cl.
*H04M 1/725* (2006.01)
*H04W 4/021* (2018.01)
*H04W 4/80* (2018.01)
*H04W 88/06* (2009.01)

(52) U.S. Cl.
CPC ............ *H04W 4/008* (2013.01); *H04W 4/80* (2018.02); *H04W 88/06* (2013.01)

(58) Field of Classification Search
CPC . H04W 4/008; H04W 4/021; H04W 52/0254; H04W 24/02; H04W 88/02; H04B 1/406; H04B 1/005; H04B 2001/045
See application file for complete search history.

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,249,505 B1 | 8/2012 | Goldner et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |

(56) References Cited

U.S. PATENT DOCUMENTS

| | | |
|---|---|---|
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2004/0174853 A1 | 9/2004 | Saito et al. |
| 2004/0266433 A1 | 12/2004 | Maillard et al. |
| 2006/0282554 A1 | 12/2006 | Jiang et al. |
| 2007/0063048 A1 | 3/2007 | Havens et al. |
| 2007/0268877 A1* | 11/2007 | Buckley .......... H04W 48/18 370/338 |
| 2009/0134221 A1 | 5/2009 | Zhu et al. |
| 2010/0075665 A1* | 3/2010 | Nader .......... H04J 11/0093 455/426.1 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0014913 A1 | 1/2011 | Yoon et al. |
| 2011/0103576 A1* | 5/2011 | Partington .......... H04M 1/006 379/419 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |

(56) References Cited

U.S. PATENT DOCUMENTS

| | | |
|---|---|---|
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0162692 A1* | 6/2014 | Li ............ H04L 67/40 |
| | | 455/456.3 |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0213277 A1* | 7/2014 | Jang ............ H04W 28/08 |
| | | 455/453 |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0016264 A1* | 1/2015 | Backholm ............ H04L 47/32 |
| | | 370/235 |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0079985 A1* | 3/2015 | Vuchula ............ H04W 48/16 |
| | | 455/435.1 |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0181382 A1* | 6/2015 | McDonald ............ H04L 67/18 |
| | | 455/456.3 |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0237560 A1* | 8/2015 | Saida ............ H04W 36/365 |
| | | 370/331 |
| 2015/0254485 A1 | 9/2015 | Feng et al. |
| 2015/0327012 A1 | 11/2015 | Bian et al. |
| 2015/0333975 A1* | 11/2015 | Sathyanath ............ H04L 63/08 |
| | | 726/3 |

(56) References Cited

U.S. PATENT DOCUMENTS

| | | | |
|---|---|---|---|
| 2015/0351013 A1* | 12/2015 | Zhang | H04W 48/18 370/328 |
| 2016/0014251 A1 | 1/2016 | Hejl | |
| 2016/0040982 A1 | 2/2016 | Li et al. | |
| 2016/0042241 A1 | 2/2016 | Todeschini | |
| 2016/0057230 A1 | 2/2016 | Todeschini et al. | |
| 2016/0109219 A1 | 4/2016 | Ackley et al. | |
| 2016/0109220 A1 | 4/2016 | Laffargue | |
| 2016/0109224 A1 | 4/2016 | Thuries et al. | |
| 2016/0112631 A1 | 4/2016 | Ackley et al. | |
| 2016/0112643 A1 | 4/2016 | Laffargue et al. | |
| 2016/0124516 A1 | 5/2016 | Schoon et al. | |
| 2016/0125217 A1 | 5/2016 | Todeschini | |
| 2016/0125342 A1 | 5/2016 | Miller et al. | |
| 2016/0133253 A1 | 5/2016 | Braho et al. | |
| 2016/0171720 A1 | 6/2016 | Todeschini | |
| 2016/0178479 A1 | 6/2016 | Goldsmith | |
| 2016/0180678 A1 | 6/2016 | Ackley et al. | |
| 2016/0189087 A1 | 6/2016 | Morton et al. | |
| 2016/0125873 A1 | 7/2016 | Braho et al. | |
| 2016/0227475 A1* | 8/2016 | Zhu | H04W 48/16 |
| 2016/0227912 A1 | 8/2016 | Oberpriller et al. | |
| 2016/0232891 A1 | 8/2016 | Pecorari | |
| 2016/0292477 A1 | 10/2016 | Bidwell | |
| 2016/0294779 A1 | 10/2016 | Yeakley et al. | |
| 2016/0306769 A1 | 10/2016 | Kohtz et al. | |
| 2016/0314276 A1 | 10/2016 | Sewell et al. | |
| 2016/0314294 A1 | 10/2016 | Kubler et al. | |
| 2016/0338121 A1* | 11/2016 | Wietfeldt | H04W 76/023 |

FOREIGN PATENT DOCUMENTS

| | | | |
|---|---|---|---|
| WO | 2013173985 A1 | 11/2013 | |
| WO | 2014019130 A1 | 2/2014 | |
| WO | 2014110495 A1 | 7/2014 | |

OTHER PUBLICATIONS

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User'S Nervous System filed Jun. 10, 2015 (Todeschini); 39 pages.

U.S. Appl. No. 14/702,110 for System and Method for Regulating Barcode Data Njection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

Combined Search and Examination Report in related UK Application No. GB1619707.1 dated Apr. 27, 2017, pp. 1-16.

* cited by examiner

| GEOFENCE | COMMUNICATION GROUP | COMMUNICATION INTERFACE | AREA NAME | AREA COORDINATES | NOTES |
|---|---|---|---|---|---|
| 1 | 1 | 1 | ZONE A | BOX[(33.0,-84.3),(36.4,-75.9)] | APPROX. NORTH CAROLINA, USA |
| 1 | 1 | 2 | ZONE A | BOX[(33.0,-84.3),(36.4,-75.9)] | APPROX. NORTH CAROLINA, USA |
| 1 | 3 | 6 | ZONE A | BOX[(33.0,-84.3),(36.4,-75.9)] | APPROX. NORTH CAROLINA, USA |
| 1 | 3 | 9 | ZONE A | BOX[(33.0,-84.3),(36.4,-75.9)] | APPROX. NORTH CAROLINA, USA |
| 2 | 2 | 5 | ZONE A | BOX[(33.0,-84.3),(36.4,-75.9)] | APPROX. NORTH CAROLINA, USA |
| 2 | 2 | 7 | ZONE A | BOX[(33.0,-84.3),(36.4,-75.9)] | APPROX. NORTH CAROLINA, USA |
| 3 | N/A | 8 | ZONE B | BOX[(30.2,-88.0),(34.9,-84.9)] | APPROX. ALABAMA, USA |
| N/A | 4 | 11 | N/A | N/A | UNUSED |
| N/A | N/A | 12 | N/A | N/A | UNUSED |
| N/A | N/A | 10 | N/A | N/A | UNUSED |
| N/A | N/A | 3 | N/A | N/A | MFR DEFAULT |
| N/A | N/A | 4 | N/A | N/A | MFR DEFAULT |

*FIG. 10*

MOBILE DEVICE WITH CONFIGURABLE COMMUNICATION TECHNOLOGY MODES AND GEOFENCES

FIELD OF THE INVENTION

Embodiments of the present invention relate to mobile devices with different communication technology modes.

BACKGROUND

Many machine-to-machine (M2M) devices (such as tracking devices and personal trackers) and portable user devices (voice/data devices such as smartphones, portable personal computers (PCs), and tablets) currently have the ability to switch between cellular technology and satellite technology to ensure network connectivity. By default, most of these devices are initially configured by manufacturers to use cellular connectivity as it is generally more economical. The devices will switch to the more costly satellite service only when there are gaps in cellular network coverage and/or when the cellular network is unavailable.

Despite technological improvements, there are still situations where the handover between cellular and satellite is not smooth and service is not guaranteed. In some instances, there may be network section delays or delays in acquisition of the satellite signal. This potential interruption in connectivity cannot always be tolerated in certain applications and services involving the devices. Further, the default configuration of cellular first and the satellite does not make sense for deployments of devices in high risk regions where the cellular connectivity is known to be unreliable (such as military risk zones, remote areas, and areas with bad weather).

Therefore, there is a need for greater flexibility in configuring M2M and portable user devices for different communication modes.

SUMMARY

A device comprising: a location-based component, wherein the location-based component provides the current location of the device; a plurality of communication interfaces; a control system communicatively coupled to the location-based component and the plurality of communication interfaces and comprising a hardware processor and a memory storing program codes whereby the device is operable to: receive configuration information comprising one or more geofences, at least one associated geofence region for each of the one or more geofences, a communication interface prioritization for each geofence that specifies the order in which each of the plurality of communication interfaces is to be used for that geofence, and a geofence prioritization that specifies the order in which each of the geofences is to be used for a given geofence region; receive an event that requires a communication activity of the device; determine the current location of the device using the location-based component; determine a geofence region based on the current location of the device; determine a geofence to use according to the geofence prioritization based on the geofence region; determine a communication interface to use according to the communication interface prioritization; and responsive to determining that at least one communication interface in the communication interface prioritization is active, use the active communication interface to complete the communication activity.

In other embodiments, the device is further operable to: responsive to determining that no communication interfaces in the communication interface prioritization are active, determine a communication interface to use according to a manufacturer default; and responsive to determining that at least one communication interface in the manufacturer default is active, use the active communication interface to complete the communication activity.

In further embodiments, the device is further operable to: responsive to determining that no communication interfaces on the device are active, entering a power off mode.

In still further embodiments, the device is further operable to: responsive to determining that no communication interfaces on the device are active, entering a sleep state for a designated period of time and waking when the designated period of time is over and retrying the communication interfaces according to the communication interface prioritization.

In more embodiments, the plurality of communication interfaces is selected from the group consisting of a cellular communication interface, a satellite interface, and a Wi-Fi communication interface.

In separate embodiments, the cellular communication interface is selected from the group consisting of: Global System for Mobile Communications (GSM), General Packet Radio Service (GPRS), Enhanced Data Rates for GSM Evolution (EDGE), Code Division Multiple Access (CDMA), Wideband Code Division Multiple Access (WCDMA), Universal Mobile Telecommunications System (UMTS), High-Speed Downlink Packet Access (HSDPA), High-Speed Uplink Packet Access (HSUPA), High-Speed Packet Access (HSPA), Long Term Evolution (LTE), and Long Term Evolution Advanced (LTE+).

In still additional embodiments, satellite communication interface is selected from the group consisting of: IsatDataPro (IDP) and/or IsatM2M offered by Inmarsat plc, Iridium, Thuraya, and Globalstar.

In additional embodiments, the order of use for the plurality of communication interfaces specified by the communication interface prioritization is selected from the group consisting of: a cellular communication interface to a satellite communication interface, a cellular communication interface to a Wi-Fi communication interface, a satellite communication interface to a cellular communication interface, a satellite communication interface to a Wi-Fi communication interface, a first satellite communication interface to a second satellite communication interface, a first cellular communication interface and a second cellular communication interface, a first Wi-Fi communication interface and a second Wi-Fi communication interface, a cellular communication interface to multiple satellite communication interfaces, a cellular communication interface to multiple Wi-Fi communication interfaces, a satellite communication interface to multiple cellular communication interfaces, a satellite communication interface to multiple Wi-Fi interfaces, cellular interface to Wi-Fi to satellite interface, only a cellular communication interface, only a satellite communication interface, and only a Wi-Fi communication interface. Embodiments of the present invention are meant to cover all possible permutations and combinations based on the amiable communication interface and number of network user priorities. This can be all, one, 2 or more. If only a cellular communication interface, only a satellite communication interface, only a Wi-Fi communication interface is chosen, the device will operate as single technology mode device. This could be changed to multiple interface technology in the device by configuring the setting.

In expanded embodiments, the configuration information is received from a remote device over a wireless connection.

In extended embodiments, the wireless connection is selected from the group consisting of: cellular, satellite, short-range, and proximity.

In another embodiment, cellular wireless connection is selected from the group consisting of: Global System for Mobile Communications (GSM), General Packet Radio Service (GPRS), Enhanced Data Rates for GSM Evolution (EDGE), Code Division Multiple Access (CDMA), Wideband Code Division Multiple Access (WCDMA), Universal Mobile Telecommunications System (UMTS), High-Speed Downlink Packet Access (HSDPA), High-Speed Uplink Packet Access (HSUPA), High-Speed Packet Access (HSPA), Long Term Evolution (LTE), and Long Term Evolution Advanced (LTE+).

In yet further embodiments, a satellite wireless connection is selected from the group consisting of: IsatDataPro (IDP) and/or IsatM2M offered by Inmarsat plc, Iridium, Thuraya, and Globalstar.

In other embodiments, the short-range wireless connection is selected from the group consisting of: Bluetooth and Wi-Fi Direct.

In further embodiments, the proximity wireless connection is Near Field Communications (NFC).

In still further embodiments, the configuration information is received via a technology selected from the group consisting of: e-mail, Short Message Service (SMS), and forward command over the air.

In more embodiments, the configuration information is received in response to user input received at the device.

In separate embodiments, the user input received at the device involves a physical switch on the device.

In still additional embodiments, the user input received at the device involves a setting in an on-screen menu on the device.

In additional embodiments, the user input received at the device involves a setting in an application on the device.

In expanded embodiments, the configuration information is received from a local device over a direct connection.

In extended embodiments, the direct connection is selected from the group consisting of: Universal Serial Bus (USB), serial (RS232), serial (RS485), and serial (RS422).

In other embodiments, the configuration information further comprises an alternative prioritization that specifies the order in which each of the plurality of communication interfaces is to be used when motion of the device is detected.

In more embodiments, the configuration information is received via an application programming interface (API).

In further embodiments, the configuration information is received in response to a region being drawn on a map.

A further aspect of the present invention describes A method for determining a communication interface to use on a device, the method comprising: receiving configuration information comprising one or more geofences, at least one associated geofence region for each of the one or more geofences, a communication interface prioritization for each geofence that specifies the order in which each of the plurality of communication interfaces is to be used for that geofence, and a geofence prioritization that specifies the order in which each of the geofences is to be used for a given geofence region; receiving an event that requires a communication activity of the device; determining the current location of the device using the location-based component; determining a geofence region based on the current location of the device; determining a geofence to use according to the geofence prioritization based on the geofence region; determining a communication interface to use according to the communication interface prioritization; and responsive to determining that at least one communication interface in the communication interface prioritization is active, using the active communication interface to complete the communication activity.

And yet a further aspect of the present invention imparts A non-transient computer-readable medium containing program instructions for causing a device to determine a communication interface to use, the method comprising: receiving configuration information comprising one or more geofences, at least one associated geofence region for each of the one or more geofences, a communication interface prioritization for each geofence that specifies the order in which each of the plurality of communication interfaces is to be used for that geofence, and a geofence prioritization that specifies the order in which each of the geofences is to be used for a given geofence region; receiving an event that requires a communication activity of the device; determining the current location of the device using the location-based component; determining a geofence region based on the current location of the device; determining a geofence to use according to the geofence prioritization based on the geofence region; determining a communication interface to use according to the communication interface prioritization; and responsive to determining that at least one communication interface in the communication interface prioritization is active, using the active communication interface to complete the communication activity.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 10 is a non-limiting example of the order of communication interfaces according to embodiments of the present invention.

DETAILED DESCRIPTION

Figure 1:
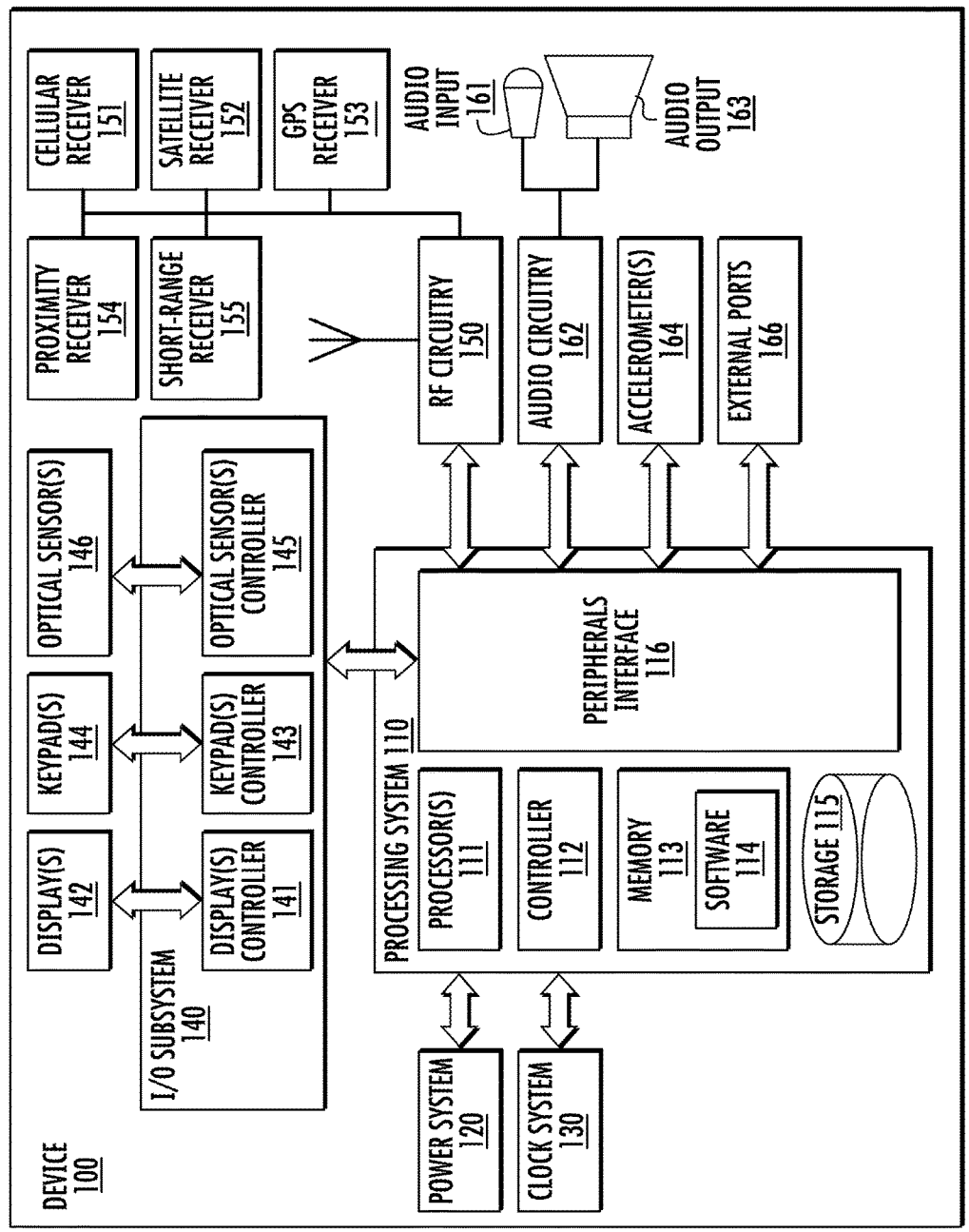
FIG. 1 is a block diagram of the hardware elements of a device according to embodiments of the present invention.

Embodiments of the present invention relate to configuring M2M devices and portable user devices for different communication modes. In some embodiments, the configurations are set directly on the device. In other embodiments, the configurations are set by local devices with a direct connection to the device. In still other embodiments, the configurations are set by remote devices over a network.

In some embodiments, the devices are dual-mode devices that support cellular and satellite communication modes. In other embodiments, the devices support three communication modes: cellular, satellite, and Wi-Fi.

Cellular technologies include, but are not limited to, Global System for Mobile Communications (GSM), General Packet Radio Service (GPRS), Enhanced Data Rates for GSM Evolution (EDGE), Code Division Multiple Access (CDMA), Wideband Code Division Multiple Access (WCDMA), Universal Mobile Telecommunications System (UMTS), High-Speed Downlink Packet Access (HSDPA), High-Speed Uplink Packet Access (HSUPA), High-Speed Packet Access (HSPA), Long Term Evolution (LTE), Long Term Evolution Advanced (LTE+), and future cellular technologies.

Satellite technologies include, but are not limited to, IsatDataPro (IDP) and/or IsatM2M offered by Inmarsat plc, Iridium, Thuraya, Globalstar, and future satellite technologies.

In other embodiments, the devices are multi-mode devices that support multiple cellular and satellite communication modes, and the utilization of the different communication modes are controlled according to a prioritized list (a prioritization) that is part of the configuration information on the device.

Throughout this disclosure, "communication interfaces" is used as a general term. In some embodiments, it will describe different communication modes of the device (such as cellular vs. satellite). In other embodiments, it is meant to describe different physical interfaces. For example, the physical communication interface for a cellular connection is a different "communication interface" from a physical communication interface for a satellite connection. The term is also meant to cover different configurations of communication interfaces and/or modes. For example, a high data rate cellular connection using a given physical communication interface is considered a different "communication interface" from a low data rate cellular connection using the same physical communication interface. In some instances, the term is meant to cover different communication protocols that might be used on the same physical hardware interfaces.

Embodiments of the present invention describe an approach to ordering or prioritizing the use of communication modes and interfaces for use in field applications (a prioritization). In some embodiments, the prioritization is an ordered list of preferred communication interfaces on the device. In other embodiments, the prioritization indicates a primary network to use (such as cellular vs. satellite) and then an order of communication interfaces to use (GSM, LTE, etc.). In more embodiments, subsets of communication interfaces are organized in groups of communication interfaces (referred to as communication groups), and the prioritization is an ordered list of communication groups, each of which has its own ordered list of communication interfaces. And in still further embodiments, communication interfaces and/or communication groups are prioritized and associated with a geofence. Geofences are also prioritized in some embodiments. A geofence is a virtual perimeter for a real-world geographic area. A geofence is activated when the geographic position of the device is within an area defined by the geofence. If a geofence is activated, then according to embodiments of the present invention, the device will use the communication interfaces specified according to the prioritization, which may include a prioritized list of communication groups each with its own prioritized list of communication interfaces or just a prioritized list of communication interfaces (no communication groups).

A geofence has particular use for M2M devices and portable user devices that may be employed in high risk areas. For example, in areas with civil unrest, the cellular communication networks may be unreliable. As such, according to embodiments of the present invention, a geofence could be employed to automatically prioritize the use of satellite communication modes according to a geofence that correlates with the areas of known unreliable cellular coverage.

Communication interfaces in embodiments of the present invention may be layered or distinct. In other words, the same communication interface may be a manufacturer default communication interface for a device as well as a communication interface that is specified in different communication groups and/or geofences.

Embodiments of the present invention also describe a multiple mode device that can operate as a single mode device. For example, a device may support three different communication modes, cellular, satellite, and Wi-Fi. While the device can be manufactured to support all three modes, in some embodiments, customers who buy and deploy the device may only activate or license one particular mode of communication. In this single mode operation, it is still possible to support the prioritization of communication interfaces as described herein, but all of the different communication interfaces in this embodiment will use only the single communication mode that is active on the device. As mentioned earlier, by way of a non-limiting example, this could be a low data rate communication interface over cellular vs. a high data rate communication interface over cellular, if cellular were the single communication mode activated for the device. But by manufacturing the device for all three communication modes, it would be possible to easily activate additional modes of communication as the needs of customers who buy and deploy the devices change. It would still be possible to then support the prioritization of communication interfaces as described herein, but now with the multiple mode device, the prioritization of communication interfaces could involve all three communication modes that are active on the device.

Embodiments of the present invention also disclose configuration information that includes an alternative prioritization that may be activated by the device when sensors on the device (such as accelerometers 164) detect motion of the device. In this manner, the device can have one prioritized list of communication interfaces while the device is stationary and a separate alternative prioritized list of communication interfaces while the device is in motion.

FIG. 1 illustrates an exemplary networked device 100 according to embodiments of the present invention. The device 100 may include other components not shown in FIG. 1, nor further discussed herein for the sake of brevity. One having ordinary skill in the art will understand the additional hardware and software included but not shown in FIG. 1.

In general, networked device 100 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smartphones, personal digital assistants, tablets, pagers, two-way radios, netbooks, barcode scanners, radio frequency identification (RFID) readers, intelligent sensors, tracking devices, and other similar computing devices.

In general, as shown, the networked device 100 of FIG. 1 includes a processing system 110 that includes one or more processors 111, such as Central Processing Units (CPUs), Application Specific Integrated Circuits (ASICs), and/or Field Programmable Gate Arrays (FPGAs), a memory controller 112, memory 113, which may include software 114 (operating systems and/or applications), and other components that are not shown for brevity, such as busses, etc. The processing system may also include storage 115.

Storage 115 may be any of the various kinds of computer components capable of storing large amounts of data in a persisting (i.e., non-volatile) and machine-readable manner. Storage 115 may be a hard disk, a solid state drive, optical drive, removable flash drive or any other component with similar storage capabilities.

The processing system 110 also includes a peripherals interface 116 for communicating with other components of the device 100. While FIG. 1 illustrates certain components, the device 100 should not be limited thereto. Device 100 may include additional components or fewer components as would be understood by one of ordinary skill in the art to meet the design requirements of the device and to achieve the embodiments of the present invention.

In some embodiments, device 100 has radio frequency (RF) circuitry 150, such as cellular receiver 151, satellite receiver 152, Global Positioning System (GPS) receiver 153, proximity receiver 154 (such as near-field communication), and short-range receiver 155 (such as Bluetooth® or Wi-Fi Direct®).

In other embodiments, device 100 has audio circuitry 162 for the audio input component 161, such as a microphone, and audio output component 163, such as a speaker. In some embodiments, for example, an M2M device might not have the audio circuitry 162, audio input 161, and audio output 163, but a portable user device (such as a smartphone) will likely have those components.

In yet further embodiments, device 100 has one or more accelerometers 164 to detect motion and/or speed and one or more external ports 166, which may be used for smart card readers or for wired connections such as wired Ethernet, USB, serial or I2C ports.

The RF circuitry 150 (and associated receivers 151, 152, 153, 154, and 155) and external ports 166 individually and collectively make up the communication interfaces for the device 100.

The processing system 110 is also connected to a power system component 120 that is used to power the device 100, such as a battery or a power supply unit or an uninterruptible power supply (UPS). The processing system 110 is also connected to a clock system component 130 that controls clock and timer functions.

The peripherals interface 116 may also communicate with an Input/Output (I/O) subsystem 140, which includes a display(s) controller 141 operative to control display(s) 142. In some embodiments the display(s) 142 is a touch-sensitive display system, and the display(s) controller 141 is further operative to process touch inputs on the touch sensitive display 142. The I/O subsystem 140 may also include a keypad(s) controller 143 operative to control keypad(s) 144 on the device 100. The I/O subsystem 140 also includes an optical sensor(s) controller 145 operative to control one or more optical sensor(s) 146. The optical sensor(s) may include, but is not limited to, a barcode sensor, a camera, and an image sensor.

The components of device 100 may be interconnected using one or more buses, represented generically by the arrows of FIG. 1, and may be mounted on a motherboard (not shown) or some other appropriate configuration.

Figure 2A:
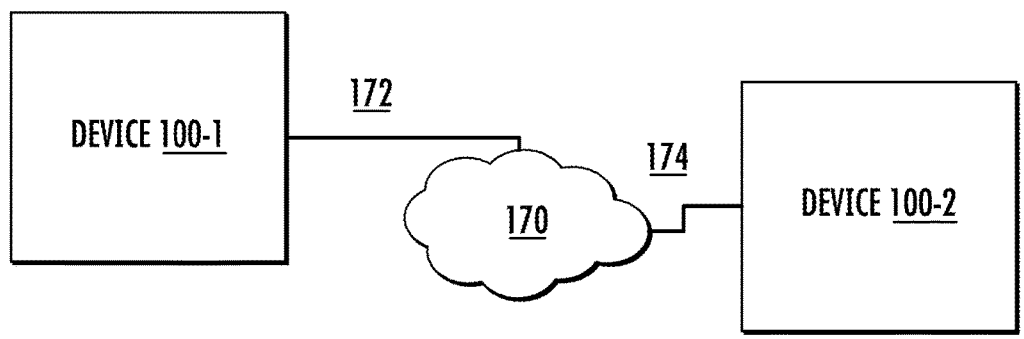
FIG. 2A and FIG. 2B are connectivity diagrams of the devices of the system in accordance with embodiments of the present invention.

In some embodiments of the present invention, the device 100 of FIG. 1 can be connected to other devices, designated 100-X. In one embodiment, device 100-1 may be connected to another device 100-2 via a network 170, as shown in FIG. 2A. The network 170 may be any type of wide area network (WAN), such as the Internet, Local Area Network (LAN), or the like, or any combination thereof. The network 170 may further include wired components, such as Ethernet, Universal Serial Bus (USB), serial (RS232, RS485, RS422), Inter-Integrated Circuit (I2C), or other computer bus. The network 170 may also include wireless components, such as cellular (LTE, etc.), satellite (Iridium, etc.), short-range (Bluetooth®, etc.), or proximity (Near-field) communication technologies. The network 170 may additionally include both wired and wireless components. The collective group of communication technologies used between devices 100-1 and 100-2 over network 170 in a particular embodiment are represented by the data links 172 and 174.

In other embodiments of the present invention, the device 100-1 may be connected to another device 100-2 directly via wired components, such as Ethernet, Universal Serial Bus (USB), serial (RS232, RS422, RS485), Inter-Integrated Circuit (I2C), or other computer bus. The device 100-1 may also be connected to device 100-2 directly via wireless components, such as such as cellular (LTE, etc.), satellite (Iridium, etc.), short-range (Bluetooth®, etc.), or proximity (Near-field) communication technologies. Device 100-1 may additionally be connected directly to device 100-2 using both wired and wireless components. The collective group of communication technologies used for the direct connection between devices 100-1 and 100-2 in a particular embodiment are represented by the data link 176, as shown in FIG. 2B.

Figure 3A:
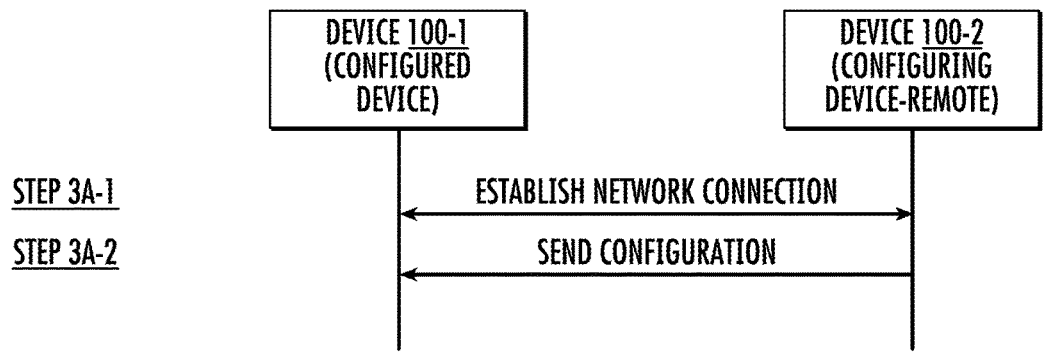
FIGS. 3A, 3B, and 3C are communication flow diagrams for establishing configuration settings on a device according to embodiments of the present invention.
Figure 3B:
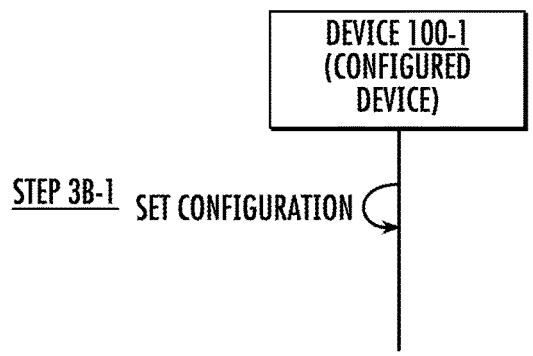
Figure 3C:
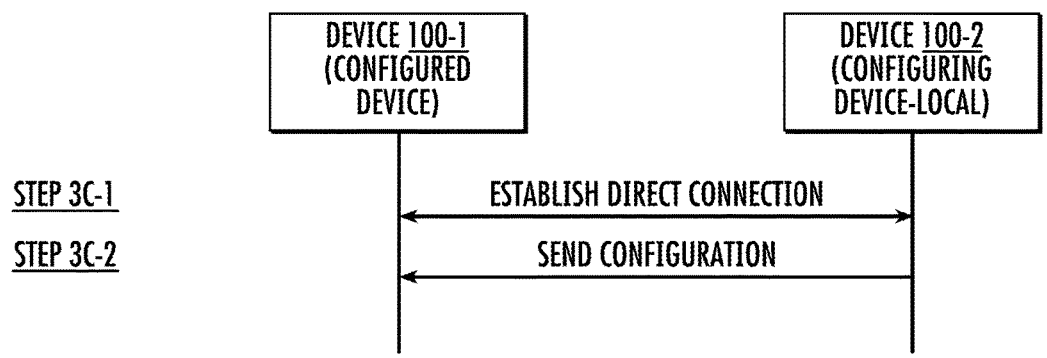

FIGS. 3A, 3B, and 3C are communication flow diagrams for establishing configuration settings on a device according to embodiments of the present invention. FIG. 3A illustrates the delivery of configuration information to the configured device 100-1 from the remote configuring device 100-2 over a network as outlined in FIG. 2A. In Step 3A-1, the configured device 100-1 and the remote configuring device 100-2 establish a network. Once established, the remote configuring device 100-2 sends the configuration information to the configured device 100-1 (Step 3A-2). Examples of this method for establishing configuration settings on the M2M device or portable user device 100-1 include but are not limited to the use of Short Message Service (SMS) messages, e-mail, and forward command over the air over wireless communication technologies such as satellite or cellular or Wi-Fi. In some embodiments, the configuration information is sent to the configured device 100-1 in response to a software application change on the remote configuring device 100-2. In other embodiments, such as those involving geofences, the configuration information is sent to the configured device 100-1 in response to a region being drawn on a map using an application on the remote configuring device 100-2. In still other embodiments, the configuration information is sent to the configured device 100-1 by the remote configuring device 100-2 using an application programming interface (API) known to both devices. These different embodiments can be combined to effect the receipt of the configuration information by the configured device 100-1. For example, in one embodiment, the configuration information may be sent to the configured device 100-1 in response to a region being drawn on a map using a software application on the remote configuring device 100-2, with the configuration information being packaged in a message consistent with an API known to both devices and delivered over the air using a cellular communication link.

FIG. 3B illustrates the setting of configuration information directly on the device. In Step 3B-1, the configuration information is set directly on the device. Examples of this method for establishing configuration settings on the M2M device or portable user device 100-1 include but are not limited to the setting of information in a preferences menu of an application that runs on the device, the setting of information in the general settings of the operating system that runs on the device, and/or the toggling of a physical switch on the device.

Figure 2B:
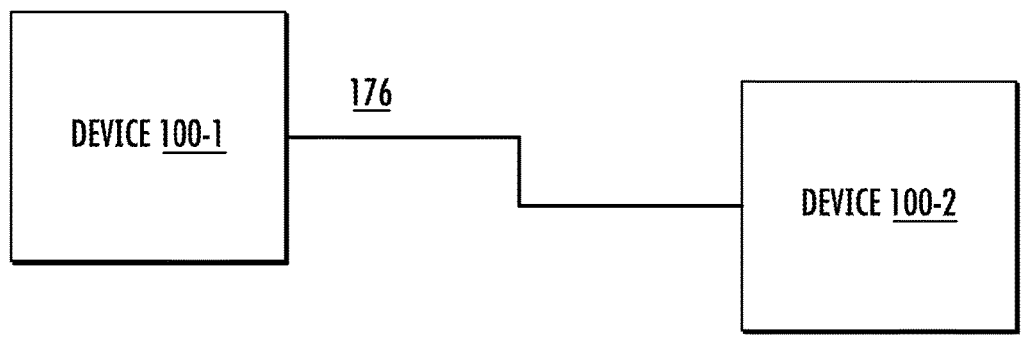

FIG. 3C illustrates the delivery of configuration information to the configured device 100-1 from the local configuring device 100-2 over a direct connection as outlined in FIG. 2B. In Step 3C-1, the configured device 100-1 and the local configuring device 100-2 establish a direct connection. Once established, the local configuring device 100-2 sends the configuration information to the configured device 100-1 (Step 3C-1). Examples of this method for establishing configuration settings on the M2M device or portable user device 100-1 include but are not limited to the use of USB or Serial connections. Note that "local" in this sense means that the configuring device 100-2 is in proximity to the configured device 100-1 so that such a direct connection is possible using wired components, wireless components, or both.

Figure 4:
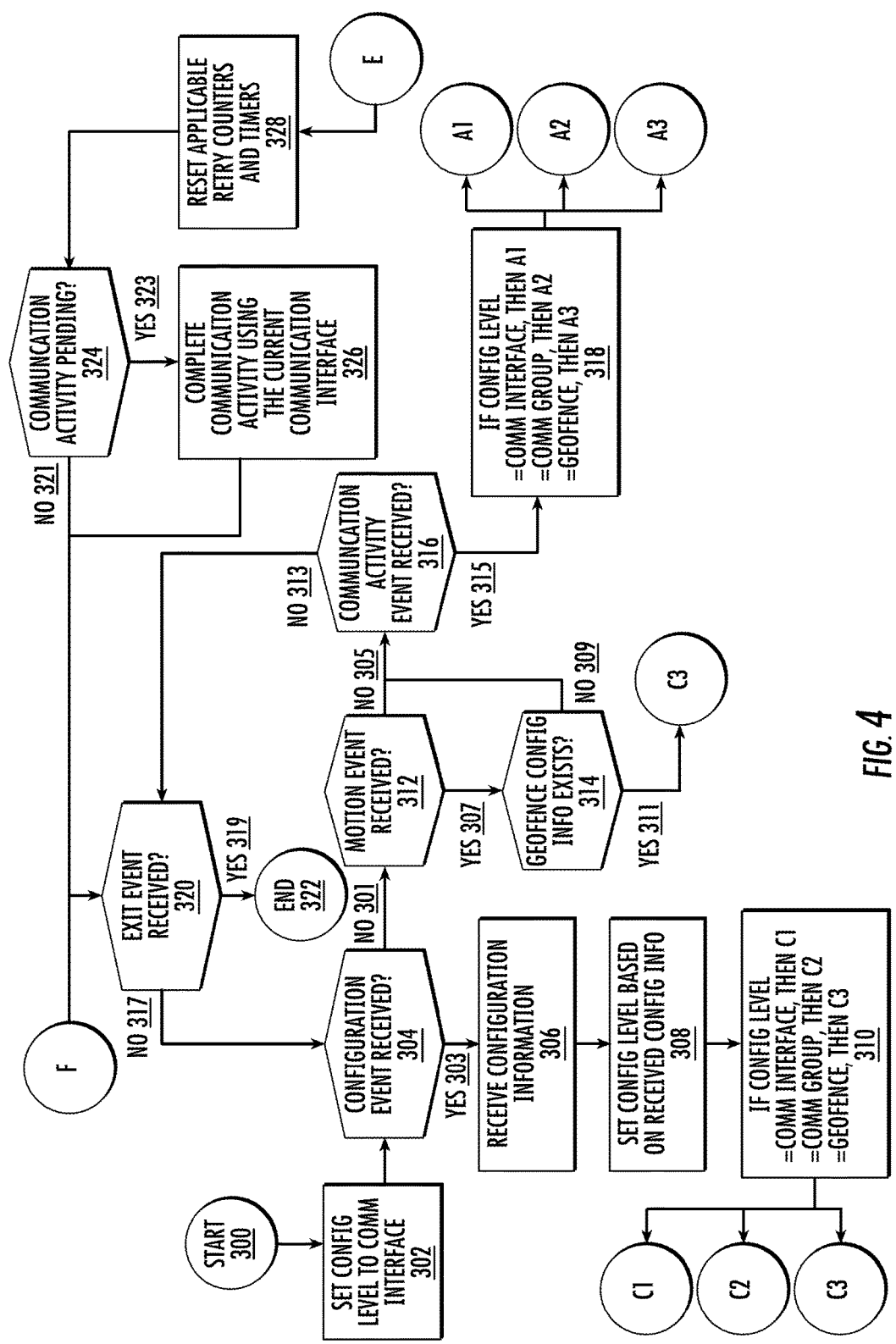
FIG. 4 is a flow chart describing the operation of a device according to embodiments of the present invention.

FIG. 4 is a flow chart describing the operation of a M2M device or portable user device 100 according to embodiments of the present invention. The process begins at Step 300 followed by Step 302 in which the device 100 sets the default configuration level to indicate communication interfaces. As discussed, embodiments of the present invention describe an approach to ordering or prioritizing the use of communication modes and interfaces for use in field applications (a prioritization), including the specification of communication interfaces to use, groups of communication interfaces to use, and/or geofences. The configuration level is a parameter used to delineate the type of configuration information that the device has received in order to determine which aspects of the process apply, according to the hierarchy of configuration information outlined in embodiments of the present invention. For example, geofences may specify a prioritization of one or more communication groups, and each communication group may specify a prioritization of one or more communication interfaces. Clearly, if a device has only received configuration information containing only a prioritization of one or more communication interfaces, then the aspects of the process related to geofencing don't apply. The configuration level parameter is used for this purpose.

In Step 304, the device 100 then checks to see if a configuration event is received. A configuration event can be the receipt of new configuration information as described in FIGS. 3A, 3B, and 3C. If so (Path 303), then the device 100 receives the configuration information (Step 306) and depending upon the type of configuration information received, the device 100 adjusts the configuration level parameter accordingly (Step 308). In Step 310, if the configuration level indicates communication interface information, then the process continues as indicated by the connector C1, and if the configuration level indicates communication group information, then the process continues as indicated by the connector C2, and if the configuration level indicates geofence information, then the process continues as indicated by the connector C3.

If no configuration event is received (Path 301), then the device 100 checks to see if a motion event has been received (Step 312). If so (Path 307), then the device 100 checks to see if it has geofence configuration information (Step 314). In some embodiments, this could involve just checking the configuration level parameter. If the device 100 has geofence configuration information (Path 311), then the process continues as indicated by the connector C3.

A motion event in the context of embodiments of the present invention is an event that indicates that the physical location of the device 100 is not fixed but changing. One example includes the detection of motion and/or speed by the accelerometer(s) 164 of the device 100. If the accelerometer(s) detect that the device is moving, this would trigger a motion event. Another example includes the detection of motion by the GPS receiver 153 of the device 100. If the GPS receiver indicates that the GPS coordinates of the device 100 are changing, this could trigger a motion event.

If the device 100 has not received a motion event (Path 305) or if the device 100 has received a motion event but does not have geofence configuration information (Path 309), then the device 100 checks to see if a communication activity event has been received (Step 316).

A communication activity event in the context of embodiments of the present invention is an event that indicates that communication (either sending, receiving or both) is required by the device. Examples of this include the need for the M2M device or portable user device 100 to report data to another device 100-2 via the network, such as reporting status and operational information. Other examples include the need by applications running on the device 100 to report information to central servers and to receive updated data from the servers.

If the device 100 has received a communication activity event (Path 315), then the process continues to Step 318. In Step 318, if the configuration level indicates communication interface information, then the process continues as indicated by the connector A1, and if the configuration level indicates communication group information, then the process continues as indicated by the connector A2, and if the configuration level indicates geofence information, then the process continues as indicated by the connector A3.

If the device 100 has not received a communication activity event (Path 313), then the device 100 checks to see if an exit event is received (Step 320). If so (Path 319), then the process ends (Step 322). If not (Path 317), the process repeats by returning to Step 304 to determine if configuration information has been received.

FIG. 4 also shows the process continuing from Connector E. In Step 328, device 100 resets applicable retry counters and timers, and then in Step 324, the device 100 checks to see if there is any communication activity pending. In one non-limiting example, this could be a message that the device 100 needs to send. In other non-limiting examples, this could be the fact that the device needs to keep an active communication channel open to receive information. If there is pending communication activity (Path 323), then the device 100 completes the communication activity using the current communication interface (Step 326). After the completion of the communication activity or if there is no communication activity pending (Path 321), the process continues to step 320 to check for an exit event as described above. FIG. 4 also shows the process continuing from Connector F which feeds directly into step 320. Connectors E and F originate from other aspects of the process as described below.

Figure 5:
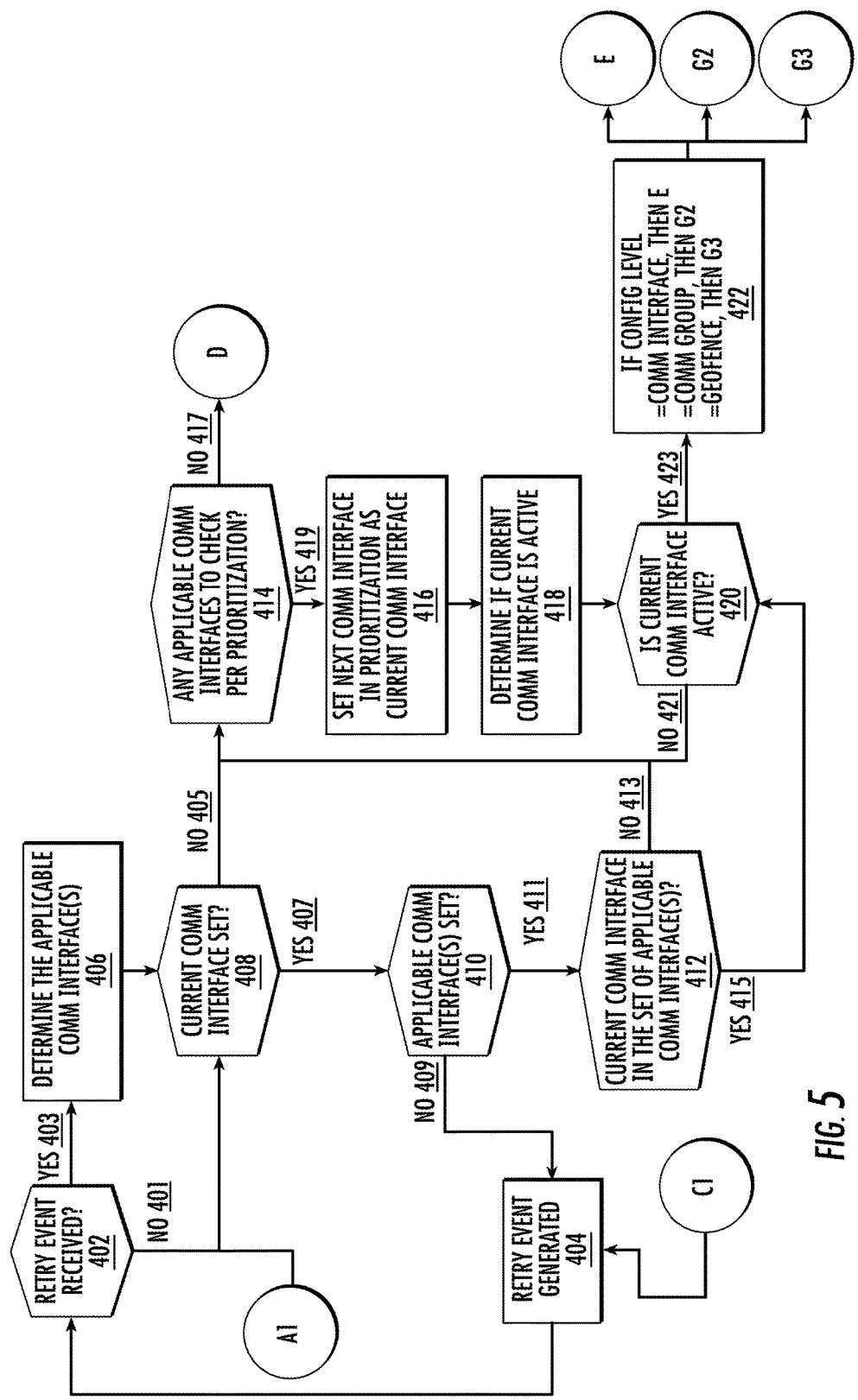
FIG. 5 is a flow chart describing the operation of a device according to embodiments of the present invention with respect to the prioritization of communication interfaces.

FIG. 5 is a flow chart describing the operation of a device according to embodiments of the present invention with respect to the prioritization of communication interfaces. FIG. 5 has two entry points to the process, A1 and C1. From Connector C1, the process continues to Step 404 where the device 100 generates a retry event. A retry event is an event that causes the process of determining an active communication interface from a prioritization of communication interfaces. The retry event can be triggered automatically or in response to user input at the device 100. The retry also ensures that the process is using the most recent configuration changes to the prioritization of the communication interfaces, if there had been any changes since the device was actively using a given communication interface.

After the retry event is generated, the device 100 checks to see if a retry event has been received (Step 402). If yes (Path 403), then the device 100 determines the applicable communication interfaces from the prioritization in the configuration information (Step 406) and proceeds to Step 408. If not (Path 401), the process continues to Step 408, which is the same place that the process begins from Connector A1. In Step 408, the device 100 determines if a current communication interface is set. A current communication interface is the interface that has been selected for device communications. If so (Path 407), then the device checks to see if the applicable communication interfaces has been set (Step 410). If not (Path 409), then the process continues to Step 404 as described earlier. If yes (Path 411), then the device 100 checks to see if the current communication interface is in the set of applicable communication interfaces (Step 412). If yes (Path 415), then the device determines if the current communication interface is active (Step 420). A current communication interface is active if it is possible to successfully complete communications with the current communication interface. If so (Path 423), then in Step 422, if the configuration level indicates communication interface information, then the process continues as indicated by the Connector E, and if the configuration level indicates communication group information, then the process continues as indicated by the connector G2, and if the configuration level indicates geofence information, then the process continues as indicated by the connector G3. In this manner, if the device is currently using a particular communication interface that is compliant with prioritization information in the configuration settings, then it can continue to use that communication interface unchanged.

If the current communication interface is not in the set of application communication interfaces (Path 413) or if the current communication interface is not active (Path 421), then in Step 414, the device 100 determine if there are any applicable communication interfaces to check according to the prioritization in the configuration information. If not (Path 417), the process continues as indicated by Connector D (described below). If yes (Path 419), then the device 100 sets the next communication interface in the prioritization as the current communication interface (Step 416) and determines if that current communication interface is active (Step 418). In some embodiments this step involves initiating some communication activity on the current communication interface. In other embodiments, it involves just powering on the current communication interface. If it is active (Step 420, Path 423), then the process continues to Step 422 as described above. If not (Path 421), then the process repeats until the list of prioritized communication interfaces has been exhausted (Path 417) or an active one is found (Step 420, Path 423). In some embodiments, when selecting the next communication interface in Step 416, the device can be configured to begin the loop at the top of the prioritized list and works its way down the list.

Figure 6:
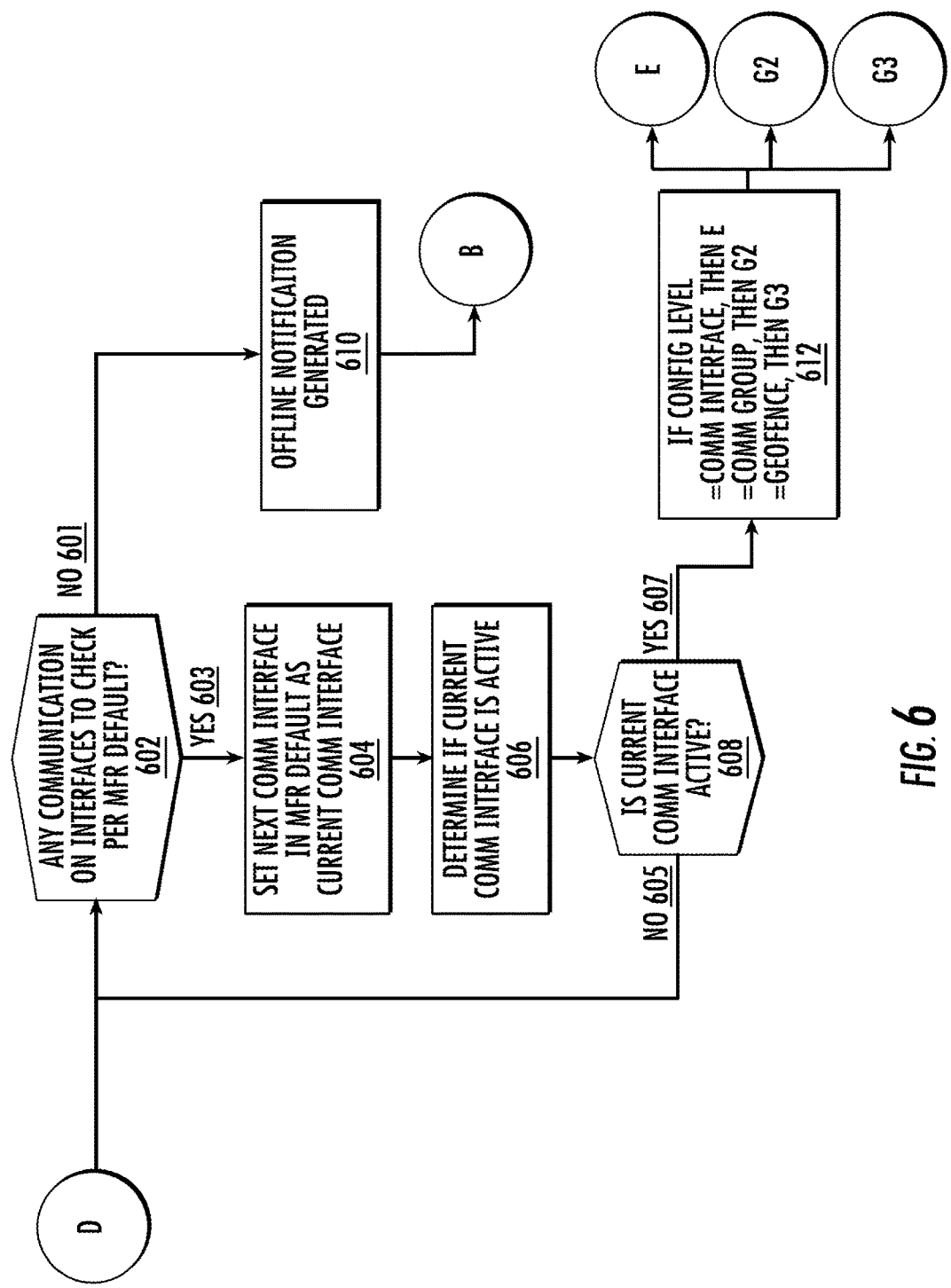
FIG. 6 is a flow chart describing the operation of a device according to embodiments of the present invention with respect to manufacturer defaults for communication interfaces.

FIG. 6 is a flow chart describing the operation of a device according to embodiments of the present invention with respect to manufacturer defaults for communication interfaces. In some embodiments of the present invention, the prioritization of communication interfaces could contain only a subset of the available communication interfaces on the device 100. If the preferred communication interfaces are not active, it still may desirable to use one of the non-preferred communication interfaces. Since most device manufacturers specify default communication interfaces, it is possible to direct the device to utilize the manufacturer defaults when preferred selections are not available. The process of FIG. 6 has one entry point, Connector D. In Step 602, the device 100 determines if there are any communication interfaces to check per the manufacturer defaults. If not (Path 601), then an offline notification is generated (Step 610) and the process continues as indicated by Connector B. If yes (Path 603), then the device 100 sets the next communication interface in the manufacturer defaults as the current communication interface (Step 604) and determines if that current communication interface is active (Step 606). In some embodiments this step involves initiating some communication activity on the current communication interface. In other embodiments, it involves just powering on the current communication interface. If it is active (Step 608, Path 607), then in Step 612, if the configuration level indicates communication interface information, then the process continues as indicated by the connector, and if the configuration level indicates communication group information, then the process continues as indicated by the connector G2, and if the configuration level indicates geofence information, then the process continues as indicated by the connector G3.

If not (Path 605), then the process repeats until the list of default communication interfaces from the device manufacturer has been exhausted (Path 601) or an active one is found (Step 608, Path 607). In some embodiments, when selecting the next communication interface in Step 604, the device can be configured to begin the loop at the top of the manufacturer defaults list and works its way down the list.

Figure 7:
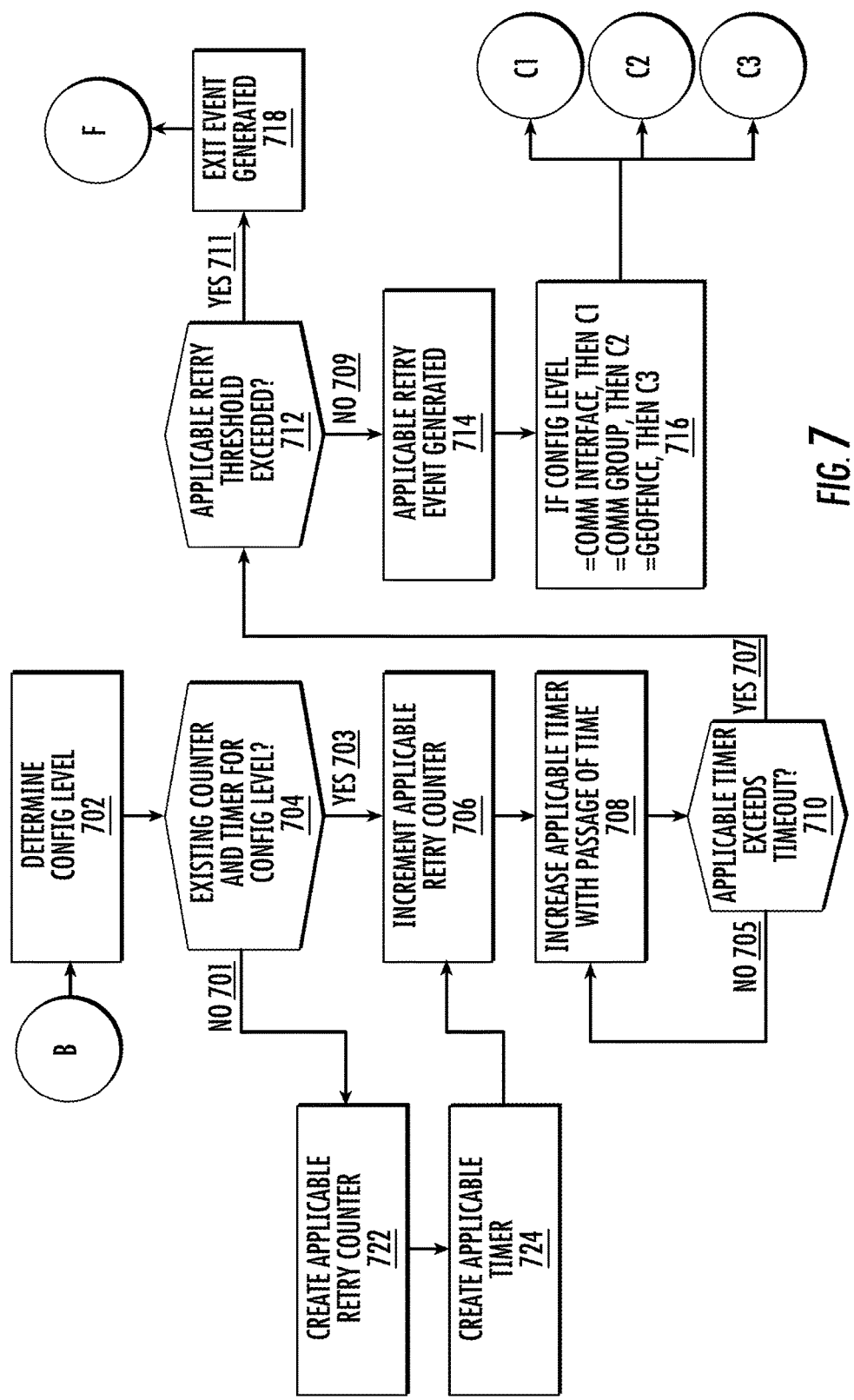
FIG. 7 is a flow chart describing the operation of a device according to embodiments of the present invention with respect to retrying failed communication modes.

FIG. 7 is a flow chart describing the operation of a device according to embodiments of the present invention with respect to retrying failed communication modes. The process of FIG. 7 has one entry point, Connector B. In Step 702, the device 100 determines the configuration level. The configuration level is used to determine which timers and counters to use for retrying failed communications. Since embodiments of the present invention describe a hierarchy of prioritization of communication interfaces according to received configuration information, in some embodiments, it may be important to retry only specific preferred prioritizations as opposed to just finding an active communication interface. For example, if a geofence is described in the configuration information, it may be desirable to initially retry the communication groups and communication interfaces of the geofence as opposed to working through the entire hierarchy of communication interfaces on the device and resulting in the use of a communication interface from the manufacturer defaults. Applicable retry counters and applicable timers refer to the fact that there may be a geofence retry counter and a geofence timer, a communication group retry counter and a communication group timer, and a communication interface retry counter and a communication interface timer.

Once the configuration level has been determined, the device 100 checks to see if there are existing retry counters and timers for the configuration level (Step 704). If not (Path 701), the device 100 creates an applicable retry counter (Step 722) and an applicable timer (Step 724) and proceeds to Step 706. If yes (Path 703), then the device 100 increments the applicable retry counter (Step 706) and increments the applicable timer with the passage of time, according to the clock system 130 (Step 708). The device 100 then checks the applicable timer exceeds the timeout (Step 710). The timeout can be a manufacturer default or can be part of the configuration information received by the device or set in response to user input at the device. If the applicable timer has not exceeded the timeout (Path 705), then the device 100 continues to increment the timer with the passage of time (Step 708) and check against the timeout (Step 710). If the applicable timer does exceed the timeout (Path 707), then the device 100 checks to see if the retry threshold has been exceed (Step 712). The retry threshold again can be a manufacturer default or may be part of the configuration information received by the device or set in response to user input at the device. If the retry threshold has been exceeded (Path 711), then the device 100 generates an exit event (Step 718) and the process continues as indicated by Connector F. When device 100 receives an exit event, in some embodiments, this is equivalent to going into a sleep mode before awaking again to retry communications. In other embodiments, the exit event may affect the shutdown of the device.

If the applicable retry threshold has not been exceeded (Path 709), then the device 100 generates the applicable retry event (Step 714). In Step 716, if the configuration level indicates communication interface information, then the process continues as indicated by the connector C1, and if the configuration level indicates communication group information, then the process continues as indicated by the connector C2, and if the configuration level indicates geofence information, then the process continues as indicated by the connector C3.

Figure 8:
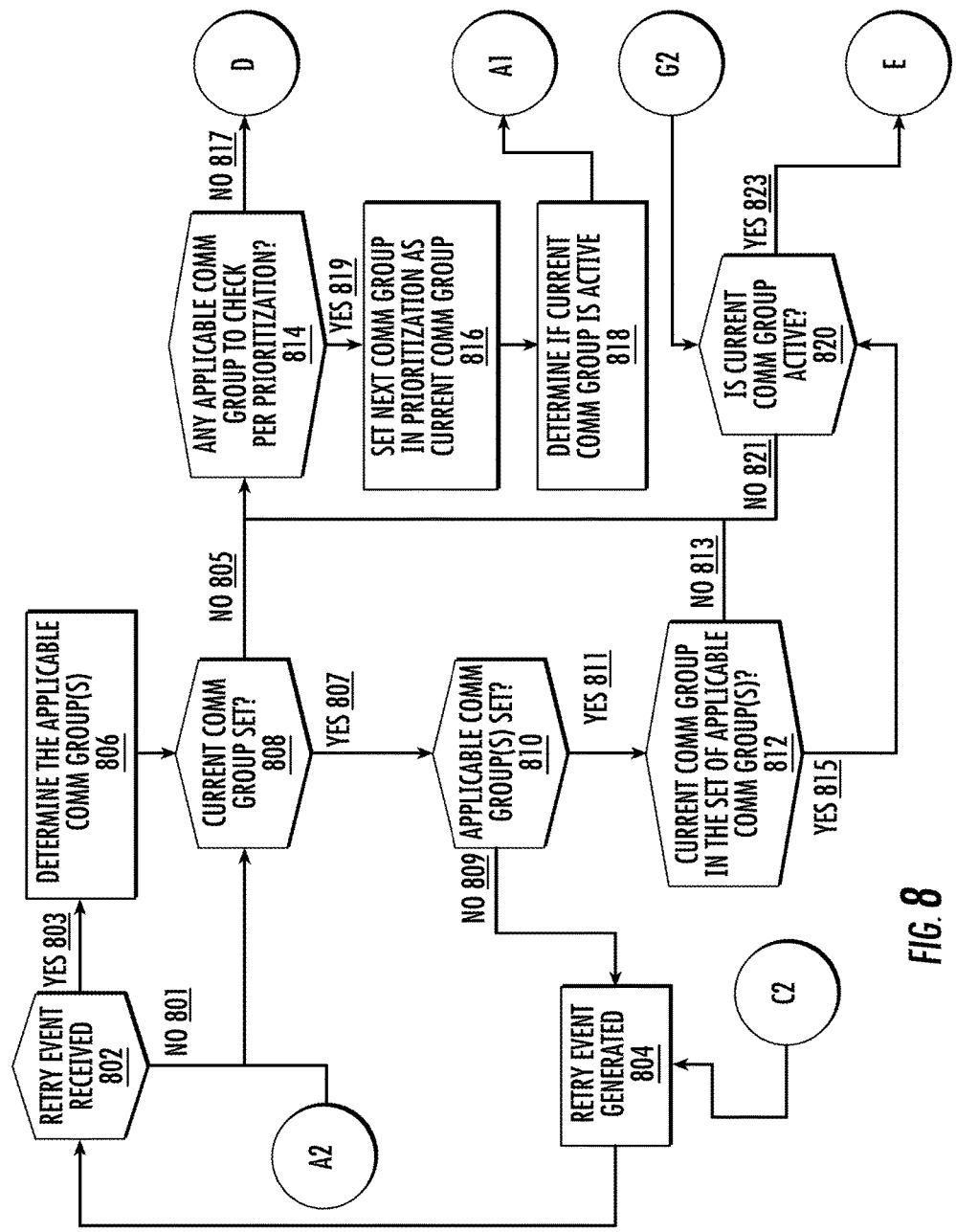
FIG. 8 is a flow chart describing the operation of a device according to embodiments of the present invention with respect to the prioritization of groups of communication interfaces.

FIG. 8 is a flow chart describing the operation of a device according to embodiments of the present invention with respect to the prioritization of groups of communication interfaces. FIG. 8 has two entry points to the process, A2 and C2. From Connector C2, the process continues to Step 804 where the device 100 generates a retry event. A retry event is an event that causes the process of determining an active communication group from a prioritization of communication groups. The retry event can be triggered automatically or in response to user input at the device 100. The retry also ensures that the process is using the most recent configuration changes to the prioritization of the communication groups, if there had been any since the device was actively using a communication interface from a given communication group.

After the retry event is generated, the device 100 checks to see if a retry event has been received (Step 802). If yes (Path 803), then the device 100 determines the applicable communication groups from the prioritization in the configuration information (Step 806) and continues to Step 808. If not (Path 801), the process continues to Step 808, which is the same place that the process begins from Connector A2. In Step 808, the device 100 determines if a current communication group is set. A current communication group is a communication group where at least one of the communication interfaces in the communication group has been selected for device communications. If so (Path 807), then the device checks to see if the applicable communication groups have been set (Step 810). If not (Path 809), then the process continues to Step 804 as described earlier. If yes (Path 811), then the device 100 checks to see if the current communication group is in the set of applicable communication interfaces (Step 812). If yes (Path 815), then the device determines if the current communication group is active (Step 820). A current communication group is active if it is possible to successfully complete communications using one of the communication interfaces that is in the communication group. If so (Path 823), then the process continues as indicated by Connector E. In this manner, if the device is currently using a particular communication interface from a communication group that is compliant with prioritization information in the configuration settings, then it can continue to use that communication interface unchanged.

If the current communication group is not in the set of applicable communication groups (Path 813) or if the current communication group is not active (Path 821), then in Step 814, the device 100 determine if there are any applicable communication groups to check according to the prioritization in the configuration information. If not (Path 817), the process continues as indicated by Connector D. If yes (Path 819), then the device 100 sets the next communication group in the prioritization as the current communication group (Step 816) and determines if that current communication group is active (Step 818). Since a communication group is an ordered list of communication interfaces, in order to determine if a communication group is active, it is necessary to check the communication interfaces in the communication group. Accordingly the process then continues as indicated by Connector A1. If at least one of the communication interfaces in the communication group is active as determined by FIG. 5, then the process returns as indicated by Connector G2, and the communication group is active (Step 820) and the process continues as indicated by Connector E. If not (Path 821), then the process repeats until the list of prioritized communication groups has been exhausted (Path 817) or an active communication group is found (Step 820, Path 823). In some embodiments, when selecting the next communication interface in Step 816, the device can be configured to begin the loop at the top of the prioritized list and works its way down the list.

Figure 9:
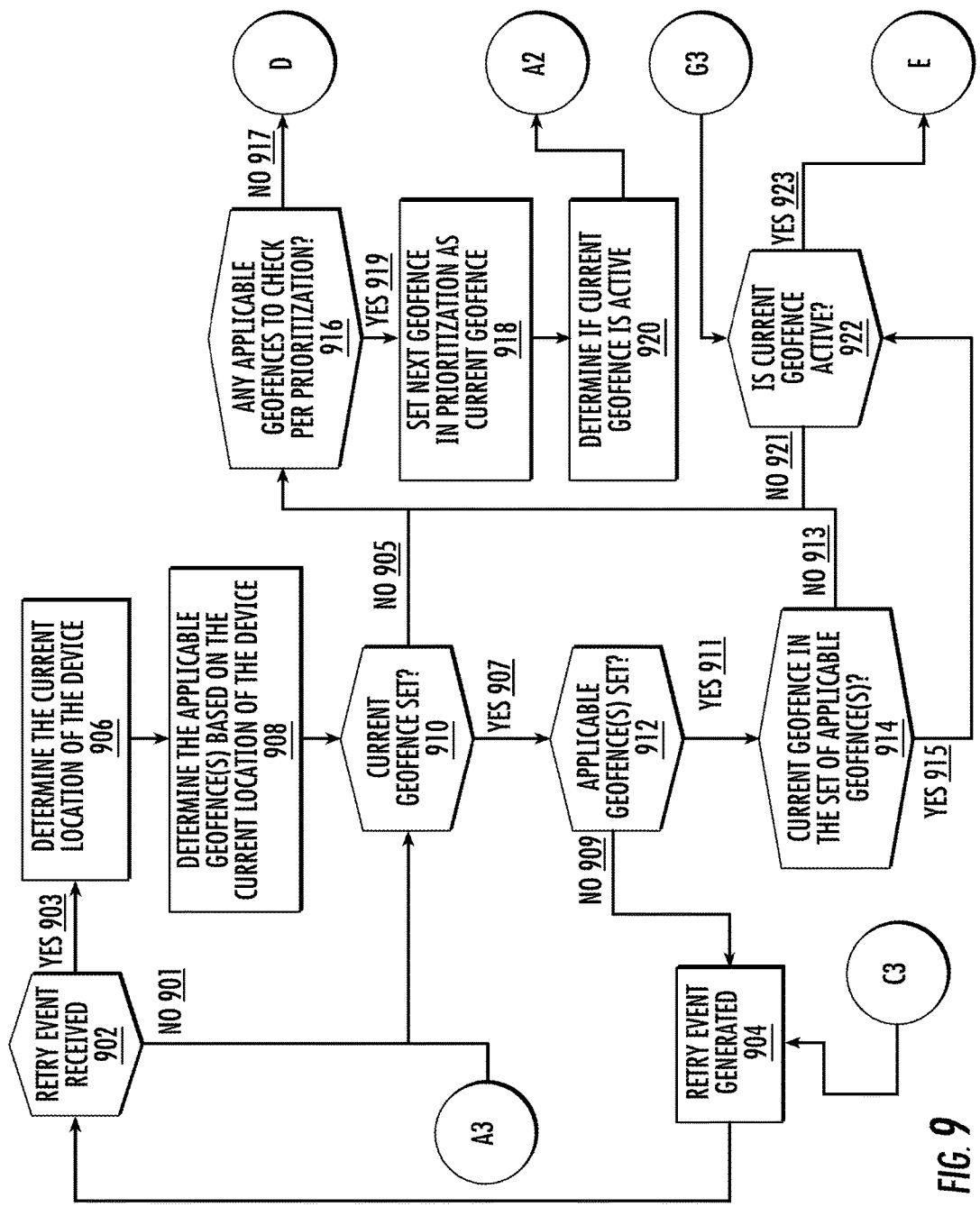
FIG. 9 is a flow chart describing the operation of a device according to embodiments of the present invention with respect to the prioritization of geofences.

FIG. 9 is a flow chart describing the operation of a device according to embodiments of the present invention with respect to the prioritization of geofences. FIG. 9 has two entry points to the process, A3 and C3. From Connector C3, the process continues to Step 904 where the device 100 generates a retry event. A retry event is an event that causes the process of determining an active geofence from a prioritization of geofences. The retry event can be triggered automatically or in response to user input at the device 100 or in response to motion of the device as discussed in FIG. 4. The retry also ensures that the process is using the most recent configuration changes to the prioritization of the geofences, if there had been any changes since the device was actively using a communication interface from a given communication group from a given geofence.

After the retry event is generated, the device 100 checks to see if a retry event has been received (Step 902). If yes (Path 903), then the device 100 determines the current location of the device (Step 906) using the GPS receiver 153 and then determines the applicable geofences based on the current location of the device and the prioritization of geofences in the configuration information (Step 908) and proceeds to Step 910. If no retry event has been received (Path 901), the process continues to Step 910, which is the same place that the process begins from Connector A3. In Step 910, the device 100 determines if a current geofence is set. A current geofence is a geofence where at least one of the communication interfaces in the geofence has been selected for device communications. If so (Path 807), then the device checks to see if the applicable geofences have been set (Step 912). If not (Path 909), then the process continues to Step 904 as described earlier. If yes (Path 911), then the device 100 checks to see if the current geofence is in the set of applicable geofences (Step 914). If yes (Path 915), then the device determines if the current geofence is active (Step 922). A current geofence is active if it is possible to successfully complete communications using one of the communication interfaces that is in the geofence. If so (Path 923), then the process continues as indicated by Connector E. In this manner, if the device is currently using a particular communication interface from a geofence that is compliant with prioritization information in the configuration settings, then it can continue to use that communication interface unchanged.

If the current geofence is not in the set of applicable geofences (Path 913) or if the current geofence is not active (Path 921), then in Step 916, the device 100 determine if there are any applicable geofences to check according to the prioritization in the configuration information. If not (Path 917), the process continues as indicated by Connector D. If yes (Path 919), then the device 100 sets the next geofence in the prioritization as the current geofence (Step 918) and determines if that current geofence is active (Step 920). Since a geofence is an ordered list of communication groups each with their own ordered list of communication interfaces or just an ordered list of communication interfaces, in order to determine if a geofence is active, it is necessary to check the communication interfaces. Accordingly the process then continues as indicated by Connector A2. If at least one of the communication interfaces in the communication groups in the geofence is active as determined by FIG. 8 and FIG. 5, then the process returns as indicated by Connector G3, and the geofence is active (Step 922) and the process continues as indicated by Connector E. If not (Path 921), then the process repeats until the list of prioritized geofences has been exhausted (Path 917) or an active geofence is found (Step 922, Path 923). In some embodiments, when selecting the next geofence in Step 918, the device can be configured to begin the loop at the top of the prioritized list and works its way down the list.

FIG. 10 is a non-limiting example of the order of communication interfaces in a device 100 according to embodiments of the present invention. In this embodiment, different communication interfaces, communication groups, and geofences will be identified by numbers which will also connote their priority, but it should be understood that the identification and priority could be separately designated in other embodiments. But in this example, it should be understood that a communication interface, communication group, or geofence with a smaller number has a higher priority. Also, while the area coordinates in this example are for boxes whose corners are delineated with GPS coordinates, it should be understood that the coordinates for the areas could take any of a variety of geometric shapes.

In FIG. 10, the device has twelve communication interfaces, numbered 1 through 12. The device 100 has received configuration information that has defined geofences associated with two areas, Zone A and Zone B, which have associated areas defined by the coordinates indicated. The configuration information indicates that there is a prioritization of geofences for Zone A, namely Geofence 1 and Geofence 2. For Zone A, Geofence 1 further has a prioritization of communication groups, namely Communication Group 1 and Communication Group 3, each with their own prioritization of communication interfaces, namely Communication Interface 1 and 2 for Communication Group 1 and Communication Interface 6 and 9 for Communication Group 3. Geofence 2 for Zone A has a prioritization of communication groups (Communication Group 2) with a prioritization of communication interfaces (Communication Interface 5 and Communication Interface 7).

Similarly, there is a single geofence for Zone B, namely Geofence 3. Geofence 3 has no prioritized communication groups but does have a prioritized communication interface (Communication Interface 8).

In the configuration information, there is an additional communication group defined (Communication Group 4) with a single communication interface (Communication Interface 11).

The configuration information also indicates that there are two additional communication interfaces without any associated communication group or communication interface (Communication Interfaces 12 and 10).

The configuration information also indicates that there are two communication interfaces (Communication Interface 3 and Communication Interface 4) which have been designated as manufacturer defaults.

Embodiments of the present invention allow for a focus or emphasis on particular configuration levels or for the entire hierarchy. For example, if the focus is on geofences and the device is in Zone A, then the final sequence of communication interfaces that will be used according to embodiments of the present invention will be communication interfaces 1, 2, 6, 9, 5, 7, 3, and 4. If the focus is on geofences and the device is in Zone B, then the final sequence will be communication interfaces 8, 3, and 4. If the focus is on a communication group, then the final sequence will be 1, 2, 5, 7, 6, 9, 11, 3, and 4. And if the focus is on communication interfaces and all communication interfaces have been prioritized, then the final sequence will be 1, 2, 3, 4, 5, 6, 7, 8, 9, 10, 11, and 12. If the focus is on communication interfaces with the manufacturer's defaults being the last resort, then the final sequence will be 1, 2, 5, 6, 7, 8, 9, 10, 11, 12, 3, and 4.

The disclosed subject matter may be embodied as devices, systems, methods, and/or computer program products. Accordingly, some or all of the disclosed subject matter may be embodied in hardware and/or in software (including firmware, resident software, microcode, state machines, gate arrays, etc.). Furthermore, the disclosed subject matter may take the form of a computer program product on a computer-usable or computer-readable storage medium having computer-usable or computer-readable program code embodied in the medium for use by or on conjunction with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnet, optical, electromagnetic, infrared, or semiconductor system, apparatus, device or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, Random Access Memory (RAM), Read-Only Memory (ROM), Electrically Erasable Programmable Read-Only Memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

\* \* \*

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; U.S. Pat. No. D702,237;

U.S. Pat. Nos. 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;

U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;

U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;

U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.); U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

\* \* \*

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A device comprising:
a location-based component, wherein the location-based component provides the current location of the device;
a plurality of communication interfaces;
a control system communicatively coupled to the location-based component and the plurality of communication interfaces and comprising a hardware processor and a memory storing program codes whereby the device is operable to:
receive configuration information comprising one or more geofences, at least one associated geofence region for each of the one or more geofences;
receive input directly from a user interface for a communication interface prioritization for each geofence that specifies the order in which each of the plurality of communication interfaces is to be used for that geofence, and a geofence prioritization that specifies the order in which each of the geofences is to be used for a given geofence region;
receive an event that requires a communication activity of the device;
determine the current location of the device using the location-based component;
determine a geofence region based on the current location of the device;
determine a geofence to use according to the geofence prioritization based on the geofence region;
determine a communication interface to use according to the communication interface prioritization;
responsive to determining that at least one communication interface in the communication interface prioritization is active, use the active communication interface to complete the communication activity;
determine a second communication interface to use according to the communication interface prioritization associated with each geofence and defined by the user input by validating a retry threshold when the active communication interface fails to complete the communication activity, the retry threshold being a defined number of attempts at completing the communication activity using the firstly determined communication interface, and the retry threshold being defined in response to the user input for the communication interface prioritization associated with the geofence; and use the second communication interface to complete the communication activity.

2. The device of claim 1, wherein the device is further operable to:

responsive to determining that no communication interfaces in the communication interface prioritization are active, determine a communication interface to use according to a manufacturer default; and responsive to determining that at least one communication interface in the manufacturer default is active, use the active communication interface to complete the communication activity.

3. The device of claim 1, wherein the device is further operable to:

responsive to determining that no communication interfaces on the device are active, entering a power off mode.

4. The device of claim 1, wherein the device is further operable to:

responsive to determining that no communication interfaces on the device are active, entering a sleep state for a designated period of time and waking when the designated period of time is over and retrying the communication interfaces according to the communication interface prioritization, wherein the retrying includes determining a configuration level parameter including the received configuration information comprising the one or more geofences and applying counters and timers applicable for setting a re-try threshold based on the determined configuration level parameters.

5. The device of claim 1, wherein the plurality of communication interfaces is selected from the group consisting of: a cellular communication interface, a satellite communication interface, and a Wi-Fi communication interface.

6. The device of claim 5, wherein the cellular communication interface is selected from the group consisting of: Global System for Mobile Communications (GSM), General Packet Radio Service (GPRS), Enhanced Data Rates for GSM Evolution (EDGE), Code Division Multiple Access (CDMA), Wideband Code Division Multiple Access (WCDMA), Universal Mobile Telecommunications System (UMTS), High-Speed Downlink Packet Access (HSDPA), High-Speed Uplink Packet Access (HSUPA), High-Speed Packet Access (HSPA), Long Term Evolution (LTE), and Long Term Evolution Advanced (LTE+).

7. The device of claim 5, wherein the satellite communication interface is selected from the group consisting of: IsatDataPro (IDP) and/or IsatM2M offered by Inmarsat plc, Iridium, Thuraya, and Globalstar.

8. The device of claim 5, wherein the order of use for the plurality of communication interfaces specified by the communication interface prioritization is selected from the group consisting of: a cellular communication interface to a satellite communication interface, a cellular communication interface to a Wi-Fi communication interface, a satellite communication interface to a cellular communication interface, a satellite communication interface to a Wi-Fi communication interface, a first satellite communication interface to a second satellite communication interface, a first cellular communication interface and a second cellular communication interface, a first Wi-Fi communication interface and a second Wi-Fi communication interface, a cellular communication interface to multiple satellite communication interfaces, a cellular communication interface to multiple Wi-Fi communication interfaces, a satellite communication interface to multiple cellular communication interfaces, a satellite communication interface to multiple Wi-Fi interfaces, cellular interface to Wi-Fi to satellite interface, only a cellular communication interface, only a satellite communication interface, and only a Wi-Fi communication interface.

9. The device of claim 1, wherein the configuration information is received from a remote device over a wireless connection.

10. The device of claim 9, wherein the wireless connection is selected from the group consisting of: cellular, satellite, short-range, and proximity.

11. The device of claim 10, wherein cellular wireless connection is selected from the group consisting of: Global System for Mobile Communications (GSM), General Packet Radio Service (GPRS), Enhanced Data Rates for GSM Evolution (EDGE), Code Division Multiple Access (CDMA), Wideband Code Division Multiple Access (WCDMA), Universal Mobile Telecommunications System (UMTS), High-Speed Downlink Packet Access (HSDPA), High-Speed Uplink Packet Access (HSUPA), High-Speed Packet Access (HSPA), Long Term Evolution (LTE), and Long Term Evolution Advanced (LTE+).

12. The device of claim 10, wherein satellite wireless connection is selected from the group consisting of: IsatDataPro (IDP) and/or IsatM2M offered by Inmarsat plc, Iridium, Thuraya, and Globalstar.

13. The device of claim 10, wherein short-range wireless connection is selected from the group consisting of: Bluetooth and Wi-Fi Direct.

14. The device of claim 10, wherein proximity wireless connection is Near Field Communications (NFC).

15. The device of claim 9, wherein the configuration information is received via a technology selected from the group consisting of: e-mail, Short Message Service (SMS), and forward command over the air.

16. The device of claim 1, wherein the user input received at the device involves a physical switch on the device.

17. The device of claim 1, wherein the user input received at the device involves a setting in an on-screen menu on the device.

18. The device of claim 1, wherein the user input received at the device involves a setting in an application on the device.

19. The device of claim 1, wherein the configuration information is received from a local device over a direct connection.

20. The device of claim 19, wherein the direct connection is selected from the group consisting of: Universal Serial Bus (USB), serial (RS232), serial (RS485), and serial (RS422).

21. The device of claim 1, wherein the configuration information further comprises an alternative prioritization that specifies the order in which each of the plurality of communication interfaces is to be used when motion of the device is detected.

22. The device of claim 1, wherein the configuration information is received via an application programming interface (API).

23. The device of claim 1, wherein the configuration information is received in response to a region being drawn on a map.

24. A method for determining a communication interface to use on a device, the method comprising:
receiving configuration information comprising one or more geofences, at least one associated geofence region for each of the one or more geofences;
receiving directly from a user a communication interface prioritization for each geofence that specifies the order in which each of the plurality of communication interfaces is to be used for that geofence, and a geofence prioritization that specifies the order in which each of the geofences is to be used for a given geofence region;
receiving an event that requires a communication activity of the device;
determining the current location of the device using the location-based component;
determining a geofence region based on the current location of the device;
determining a geofence to use according to the geofence prioritization based on the geofence region;
determining a communication interface to use according to the communication interface prioritization;
responsive to determining that at least one communication interface in the communication interface prioritization is active, using the active communication interface to complete the communication activity;
determining a second communication interface to use according to the communication interface prioritization associated with each geofence and defined by the user input by validating a retry threshold when the active communication interface fails to complete the communication activity, the retry threshold being a defined number of attempts at completing the communication activity using the firstly determined communication interface, and the retry threshold being defined in response to the user input for the communication interface prioritization associated with the geofence; and
using the second communication interface to complete the communication activity.

25. A non-transitory computer-readable medium containing program instructions for causing a device to determine a communication interface to use, the method comprising:
receiving configuration information comprising one or more geofences, at least one associated geofence region for each of the one or more geofences;
receiving directly from a user a communication interface prioritization for each geofence that specifies the order in which each of the plurality of communication interfaces is to be used for that geofence, and a geofence prioritization that specifies the order in which each of the geofences is to be used for a given geofence region;
receiving an event that requires a communication activity of the device;
determining the current location of the device using the location-based component;
determining a geofence region based on the current location of the device;
determining a geofence to use according to the geofence prioritization based on the geofence region;
determining a communication interface to use according to the communication interface prioritization;
responsive to determining that at least one communication interface in the communication interface prioritization is active, using the active communication interface to complete the communication activity;
determining a second communication interface to use according to the communication interface prioritization associated with each geofence and defined by the user input by validating a retry threshold when the active communication interface fails to complete the communication activity, the retry threshold being a defined number of attempts at completing the communication activity using the firstly determined communication interface, and the retry threshold being defined in response to the user input for the communication interface prioritization associated with the geofence; and
using the second communication interface to complete the communication activity.

* * * * *